July 3, 1928.

M. H. ROBERTS

POWER REVERSE GEAR MECHANISM

Filed Feb. 7, 1924

WITNESS
Chester Genzlinger

INVENTOR
Montague H. Roberts
BY
Synnestvedt & Lechner
ATTORNEYS

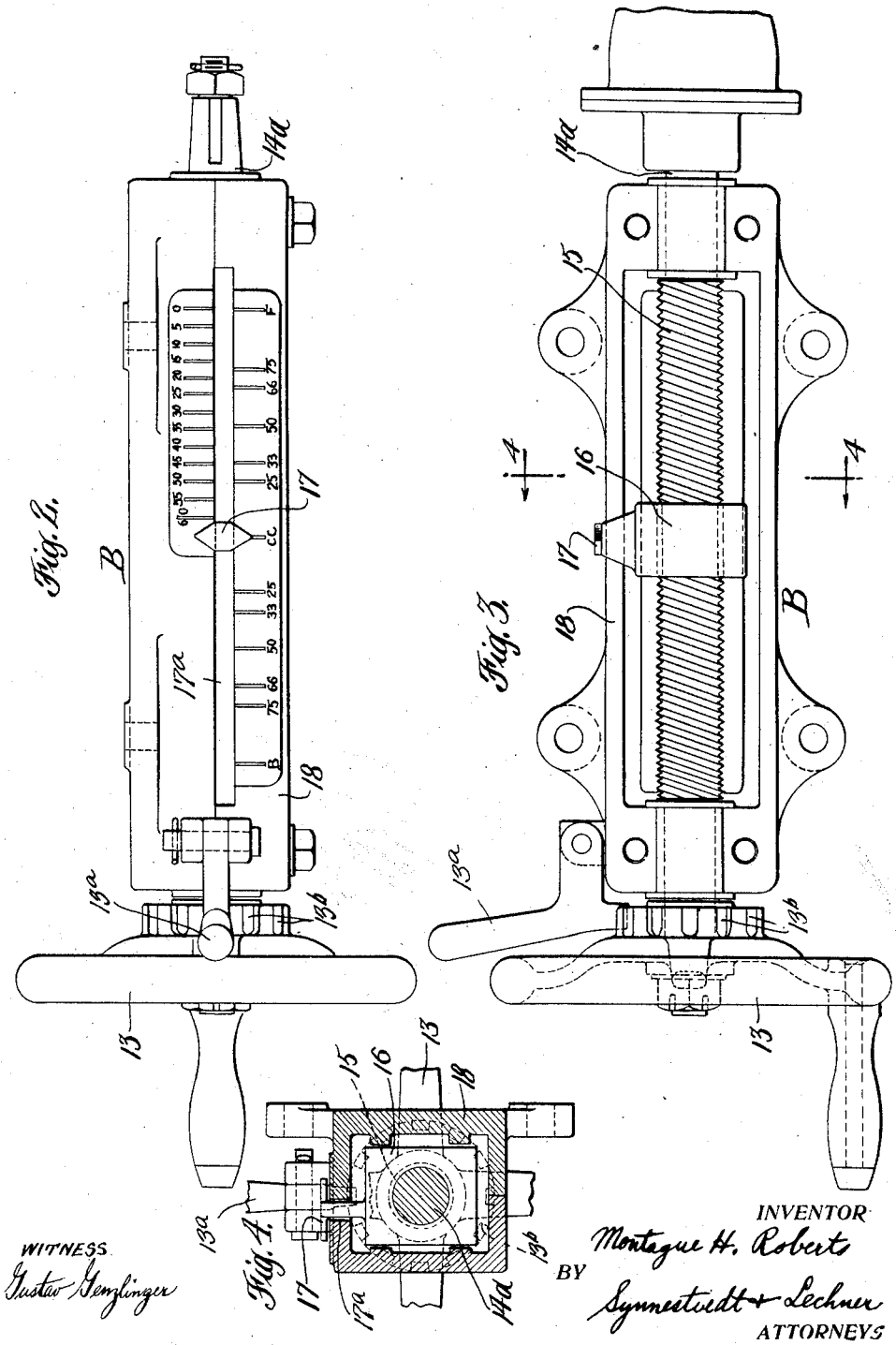

Patented July 3, 1928.

1,675,576

UNITED STATES PATENT OFFICE.

MONTAGUE H. ROBERTS, OF ENGLEWOOD, NEW JERSEY, ASSIGNOR TO FRANKLIN RAILWAY SUPPLY COMPANY, OF NEW YORK, N. Y., A CORPORATION OF DELAWARE.

POWER REVERSE GEAR MECHANISM.

Original application filed February 26, 1921, Serial No. 448,044. Divided and this application filed February 7, 1924. Serial No. 691,218.

This invention relates to power reverse gear mechanism and is a division of my copending application Serial No. 448,044, filed February 26th, 1921, and since issued as Patent No. 1,500,685, on July 8, 1924.

The reverse gear of the aforesaid application is one in which there is a direct connection between the valve and the piston, which is manually variable to move the valve to actuate the piston to adjust cut-off, but which is of such character that when the piston moves under load, shock, thrust or drop in pressure or similar cause, the valve is caused to move with the piston to automatically restore the piston to the preselected position. The connection, as illustrated in said application, comprises a screw threaded shaft and, since the piston of a reverse gear has considerable stroke—usually in the neighborhood of 18″—the thread must be of a length at least equal to the stroke of the piston.

The screw threaded shaft is operated from the cab by a hand wheel and a suitable connection, the hand operating means being employed to actuate an indicator which indicates the position of the piston and, therefore, the cut-off of the valve, or the speed if desired. It is impractical, particularly in locomotive service, to have an indicating mechanism which has a stroke as long as that of the piston.

It is the primary object of this invention to provide an arrangement of means associated with a gear of this character whereby the indication is on a reduced or proportional scale making it possible to secure the desired compactness of the indicating mechanism.

The foregoing, together with such other objects as may hereinafter appear, or are incident to my invention, I obtain by means of a construction which I have illustrated in preferred form in the accompanying drawings wherein:

Fig. 2, is a plan view of the hand operating wheel and the indicator, drawn on an enlarged scale;

Fig. 3, is a side elevation of Fig. 2; and

Fig. 4 is a section taken on the line 4—4 of Fig. 3.

Figure 1:
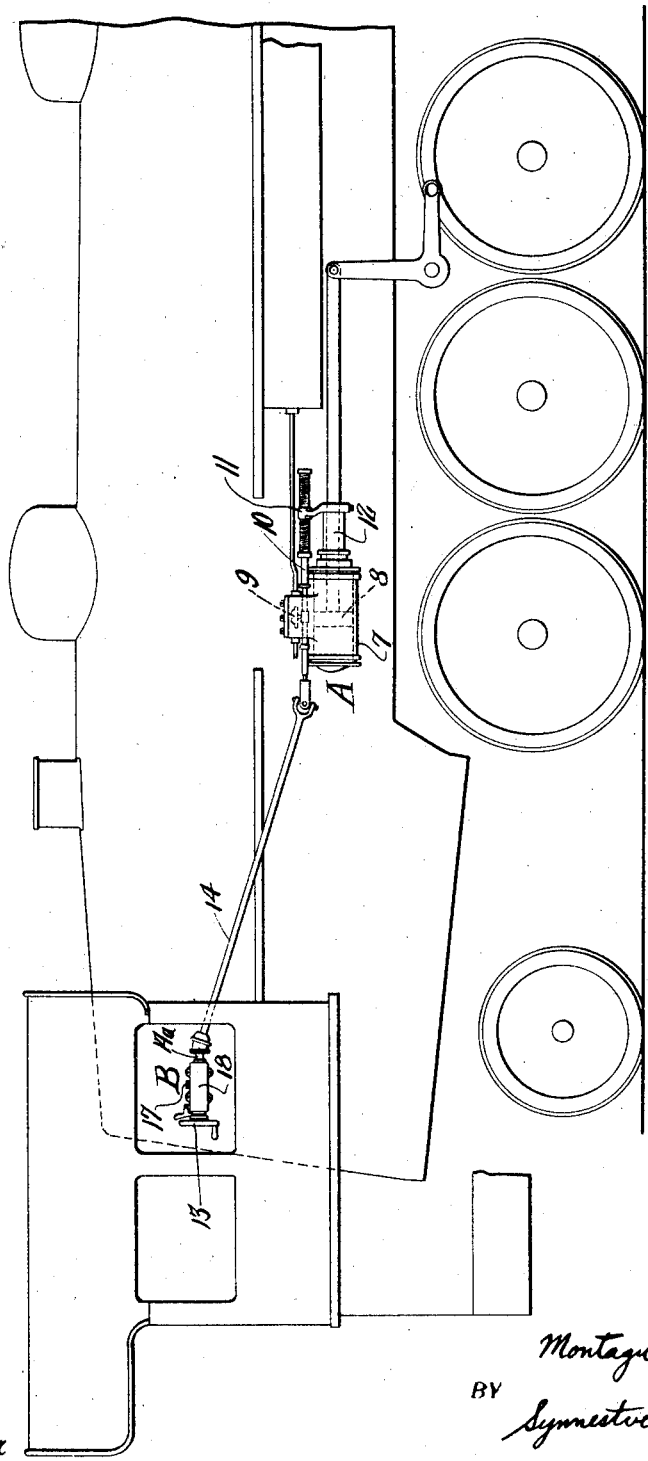
Fig. 1, is a diagrammatic side elevation of a portion of a locomotive, illustrating the reverse gear and its hand operating means, together with the indicator.

Referring now to Fig. 1, the reference character "A" denotes the gear, indicated as a whole, such gear comprising a cylinder 7, piston 8, controlling valve 9 and the screw threaded shaft 10, between the valve and the piston, which is adapted to be manually varied to actuate the valve to move the piston to adjust cut-off and also to be automatically moved when the piston moves from any selected position of adjustment to cause the valve to move with it to rectify the position of the piston. The shaft 10 has threaded engagement with the nut 11 carried on the piston rod 12 of the piston.

The screw shaft 10 is operated from the cab by means of the hand wheel 13 and the shafting 14. The threaded portion of the shaft 10 is of a length equal to the stroke of the piston as the connection must be capable of variation with respect to the piston in an amount equal to the stroke of the piston.

The cut-off indicator B is operated when the hand wheel 13 is turned in the following manner.

Referring to Figs. 2–4 inclusive, it will be seen that the length of shaft 14ª turned by the hand wheel 13 has a bearing in a two part housing 18, the parts of which are constructed so as to leave a slot 17ª in the top thereof, and that the shaft 14ª has a screw thread 15 the threads of which have a less pitch than the threads of the shaft 10, in this case one-half. The threaded portion 15 is, therefore, one-half the length of the threaded portion of the shaft 10. Mounted on the threaded portion 15 is a square nut 16 having a pointer 17. The nut is prevented from turning by means of the box 18 in which the shaft 14ª is mounted. The upper face of the box is graduated as indicated in Fig. 2 to indicate the percent of cut-off and also miles per hour.

When the shaft 10 is rotated to effect an adjustment, the nut 16 is moved in an amount one-half that of the adjustment of the shaft 10 with reference to the piston, and thus the indicator mechanism is made simple and compact and available for use in the limited space afforded in the cab which, as those skilled in the art will readily understand, is crowded with mechanism and instruments.

In order to lock the parts in desired positions of cut off, I provide the hand latch 13ª mounted on the housing 18 and adapted to engage any one of the notches 13ᵇ in the hand wheel hub. No load is transmitted to this lock, and neither does it interfere in the slightest degree with the automatic operation of the gear parts.

I claim:

1. A cut-off indicator for power reverse gears comprising in combination, a screw shaft, a nut on said shaft having a protruding indicator thereon and a split casing adapted to house the shaft and nut and providing an elongated opening at the split through which said indicator is adapted to protrude.

2. A cut-off indicator for power reverse gears comprising in combination, a screw shaft, a nut on said shaft having a protruding indicator thereon and a split casing adapted to house the shaft and nut and providing an elongated opening at the split through which said indicator is adapted to protrude, together with a cut-off indicating scale on one part of said casing adjacent said opening.

3. A cut-off indicator for power reverse gears comprising in combination, a screw shaft, a nut on said shaft having a protruding indicator thereon and a split casing adapted to house the shaft and nut and providing an elongated opening at the split through which said indicator is adapted to protrude, together with a cut-off indicating scale on one part of said casing adjacent said opening, and a miles per hour indicating scale on another part of said casing adjacent said opening.

4. A cut-off indicator for power reverse gears comprising in combination, a screw shaft, a nut on said shaft having indicating means associated therewith, and a casing adapted to house said shaft and nut, together with upstanding guideways on the interior of said casing extending longitudinally of said screw and adapted to engage the nut and prevent its rotation.

5. A cut-off indicator for power reverse gears comprising in combination, a screw shaft, a nut on said shaft and a split casing enclosing the shaft and nut and providing bearings for said shaft, together with an elongated opening at a split in the casing and an indicator associated with said nut adapted to protrude through said openings.

In testimony whereof, I have hereunto signed my name.

MONTAGUE H. ROBERTS.